United States Patent
Kikuchi et al.

[11] Patent Number: 5,927,908
[45] Date of Patent: Jul. 27, 1999

[54] POWDER COLLECTING AND TRANSPORTING DEVICE

[75] Inventors: Masao Kikuchi; Takayuki Ichimura, both of Utsunomiya, Japan

[73] Assignee: Rheon Automatic Machinery Co., Ltd., Tochigi-ken, Japan

[21] Appl. No.: 08/789,128

[22] Filed: Jan. 28, 1997

[30] Foreign Application Priority Data

Feb. 20, 1996 [JP] Japan .................................. 8-058301

[51] Int. Cl.⁶ .................................................. B65G 53/46
[52] U.S. Cl. ............................ 406/129; 406/79; 222/553
[58] Field of Search ................................ 406/79, 80, 81, 406/129; 222/548, 553

[56] References Cited

U.S. PATENT DOCUMENTS

| | | | |
|---|---|---|---|
| 2,827,928 | 3/1958 | Guckel | 222/553 X |
| 3,182,867 | 5/1965 | Barosko et al. | 222/553 X |
| 3,332,582 | 7/1967 | Tills | 406/129 |
| 3,350,141 | 10/1967 | McGrath | 406/129 |
| 3,717,752 | 2/1973 | Warning | 239/654 |

FOREIGN PATENT DOCUMENTS 3203887  10/1982  Germany .

Primary Examiner—Andrew C. Pike
Attorney, Agent, or Firm—Sughrue, Mion, Zinn, Macpeak & Seas, PLLC

[57] ABSTRACT

A powder collecting and transporting device can collect powder left on a conveyer after the powder is sprinkled on cakes and bread into a laterally elongated powder container, and transport the powder in the container to a desired location by air suction. The device includes a hopper having an elongated powder discharge opening at its bottom portion and a cylindrical frame fluidly connected to the bottom portion. In the cylindrical frame, a suction pipe is rotatably provided. The suction pipe has an end portion in communication with a suction device. The suction pipe is formed with a slit at its peripheral surface. The slit forms a spiral line making one round along the longitudinal axis of the suction pipe. A part of the spiral slit is in alignment with the discharge opening to provide a suction port having small area for providing fluid communication between the hopper and the suction pipe. By rotation of the suction pipe, the suction port is moved along the longitudinal direction of the powder discharge opening.

8 Claims, 5 Drawing Sheets

POWDER COLLECTING AND TRANSPORTING DEVICE

BACKGROUND OF THE INVENTION

The present invention relates to a powder collecting and transporting device used during production processes of food products, such as cakes and bread for collecting residual or excess powder.

In a conventional process of producing food products such as cakes and bread, powder is sprinkled on the food. Examples of the powder sprinkled on food include flour for preventing stickiness of dough during its handling, chocolate powder, sesame seeds, and crushed nuts for decoration of food products. Usually, this sprinkling process is performed on a conveyer belt. However, when the powder is sprinkled on the food, excess powder is sprinkled on the running conveyer and transported at the same time. Conventionally, the excess powder on the conveyer is collected for sanitation or reuse as necessary.

Examples of collection methods include placing a vessel below the end of the conveyer belt. The excess powder falls off the end of the conveyer due to its own weight and is collected into the vessel, or the powder on the conveyer is scraped off by a scraper and is dropped into the vessel.

The powder collected in the container is regularly removed by a user after stopping the operation of the machine. When the operation of the machine cannot be stopped, the powder is usually sucked up for collection using a suction device, such as a vacuum cleaner.

With a conventional process, it is a great burden for a user to collect, clean, and transport the large amount of powder retained in a large-sized device required for mass production. Also, the conventional cleaning process itself is unsanitary for the production environment. Therefore, it is desirable that the above-described processes be automated.

FIG. 6 shows a conventional automatic powder collecting device. The powder collecting device includes an elongated container or hopper having a powder receiving portion 108A and a cylindrical portion 108B connected to the bottom of the powder receiving portion 108A. At the connecting portion between the powder receiving portion 108A and the cylindrical portion 108B, an elongated slit or suction port 30 is formed. One end of the cylindrical portion 108B is connected to a powder transport pipe 17 fluidly connected to a suction device (not shown). The powder 4 dropped from the conveyer and received in the powder receiving portion 108A is further dropped into the cylindrical portion 108B through the elongated suction opening 30, and is transported to a desired location through the transport pipe 17 by the operation of the suction device.

Because the suction opening 30 is formed elongated as is the container, large suction area results. Therefore, increased sucking power must be required. To increase the sucking power the transport pipe 17 through which the powder is sucked must be sufficiently large and the suction device 17 must provide strong suction performance.

However, as shown in FIG. 6, the suction power does not operate equally effectively at suction opening 30 near to and far from the suction device 17. Sucking is unevenly performed so that the powder 4 in the receiving portion 108A cannot be sucked evenly. As a result, this causes the problem in that powder 4 remains in the receiving portion 108A as shown in FIG. 6 without being sucked completely.

Therefore, in the automatic powder collection device, a collecting operation by a user is also needed. Moreover, because the device handles food products, there is a danger that an unsanitary situation might develop from organisms growing in the powder remaining in the container.

If the powder receiving portion has a large vertical length so as to provide a conical shape in order to concentrate the suction opening 30 into a small area, such problem may be solved. However, another problem may occur in that a bridge may be formed in the hopper by the powders compressed at the lower portion of the hopper. Further, due to the special problem, it is impossible to install such a tall powder receiving portion below the end of the conveyer belt.

SUMMARY OF THE INVENTION

It is therefore an object of the present invention to provide a powder collecting and transporting device capable of gathering the powder in the container to a predetermined spot without any large-sized suction device.

Another object of the present invention is to provide the powder collecting and transporting device with a simple configuration to facilitate cleaning and other maintenance processes.

These and other objects of the present invention will be attained by a powder collecting and transporting device including an elongated hopper, an elongated cylindrical frame, a suction pipe, a transport pipe, and a suction device. The elongated hopper is adapted for receiving powders, and has a bottom portion formed with an elongated powder discharge opening. The elongated cylindrical frame is disposed below and in communication with the powder discharge opening. The suction pipe is movably supported in the cylindrical frame and has a sleeve portion formed with an opening. At least a part of the opening is in alignment with the powder discharge opening upon movement of the suction pipe for providing a suction port in fluid communication between the hopper and the pipe. The transport pipe is fluidly connected to the pipe, and the suction device is fluidly connected to the transport pipe for introducing the powders in the hopper into the suction pipe through the suction port.

DETAILED DESCRIPTION OF THE PREFERRED EMBODIMENTS

Figure 1:
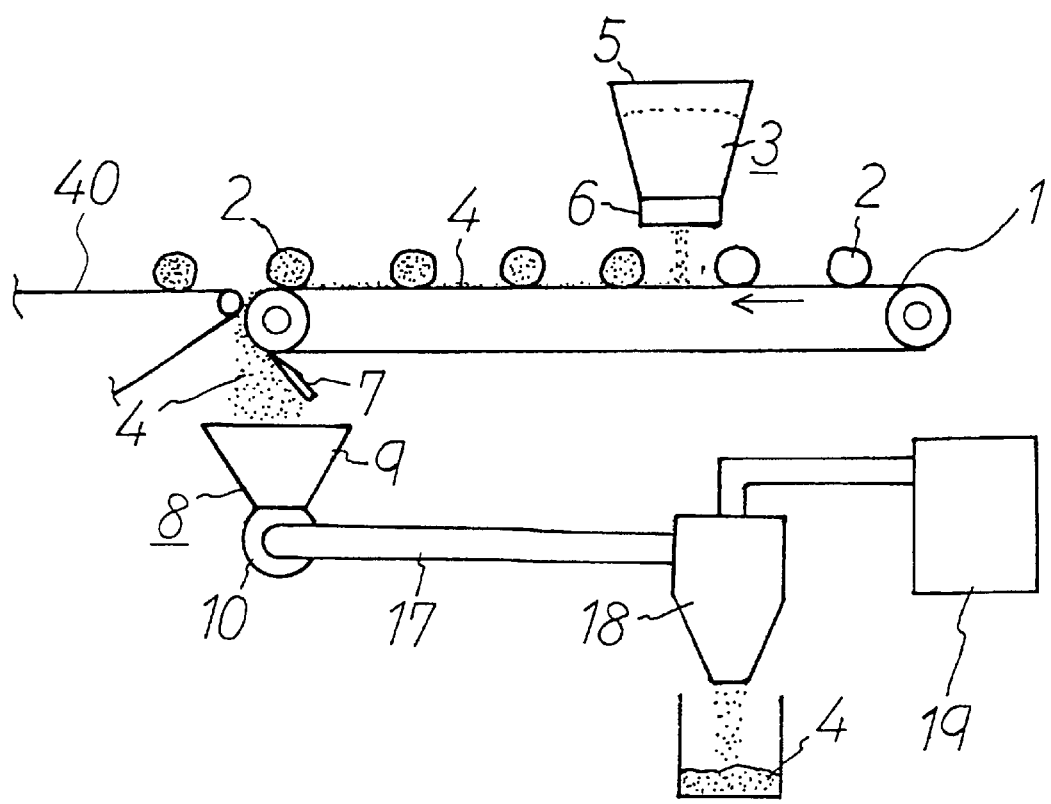
FIG. 1 is a schematic side view showing a powder sprinkling system and a powder collecting and transporting device according to a first embodiment of the present invention.

A powder collecting and transporting device according to one embodiment of the present invention will be described with reference to FIGS. 1 through 4. The powder collecting and transporting device is operated to collect powder used in a powder sprinkling system.

The powder sprinkling system includes a conveyer belt 1 for transporting food 2 and a sprinkler 3 for sprinkling powder onto the food 2. The food 2 is made in a preceding process and is then put on the conveyer belt 1. The typical example of the food 2 is of a sticky material such as a dough of bread, rice cake, dough of noodle and confectionery, rice ball, fish paste, etc. The conveyer belt 1 is of an endless belt having a sufficient width. The sprinkler 3 is disposed above the conveyer belt 1 and is spaced away from the conveyer 1 by a space enabling food to pass between the sprinkler 3 and the conveyer belt 1. The sprinkler 3 includes a hopper 5 filled with powder 4 and a sprinkle portion 6 provided below the hopper 5. The sprinkler 3 per se is well known in the art. Preferably, the sprinkle portion 6 should be changeable for adjusting sprinkling width and powder sprinkling amount.

The powder 4 can be any powder according to type, objective, and use of the food dough 2. Examples of the powder are flour, chocolate powder, sesame seeds, salt, crushed nuts, and bread crumbs.

Another conveyer belt 40 is disposed downstream of the conveyer belt 1, so that the food can be transferred from the conveyer belt 1 to the conveyer belt 40. A fine gap is provided between the conveyer belts 1 and 40 so as to prevent the powder 4 on the conveyer belt 1 from being transferred to the conveyer belt 40.

A scraper 7 is provided at a downstream end of the conveyer 1. A top end of the scraper 7 contacts the surface of the conveyer belt 1 to scrape off the powder 4 clinging to the conveyer 1.

At a position below the powder sprinkling device, the powder collecting and transporting device is provided. The powder collection device includes a container 8 provided below the scraper 7 for collecting the powder 4. The container 8 includes a hopper 9, a cylindrical frame 10 connected to the hopper 9, and a suction pipe 11 housed in the cylindrical frame 10. The hopper 9 has a funnel shape, that is, the cross-sectional area of upper portion is larger than the lower portion. The hopper 9 has an upper opening with a width and length long enough for receiving the powder 4 falling off the conveyer belt 1. The hopper 9 has a bottom discharge opening 12 having a rectangular shape with a length the same as the length of the hopper 9 and with a width smaller than the width of the upper opening.

The cylindrical frame 10 connects to the bottom discharge opening 12 of the hopper 9. The cylindrical frame 10 has a circular shape in cross-section and extends to a length which is the same as the length of the hopper 9. An opening 13 is formed on the upper side of the cylindrical frame 10 so that the opening 13 is fluidly connected to the bottom discharge opening 12 of the hopper 9.

The suction pipe 11 has a cylindrical shape with a length approximately the same as that of the cylindrical frame 10. The suction pipe 11 is housed in the cylindrical frame 10 and is rotatable about its axis in the cylindrical frame 10. A motor 14 is provided at one end of the cylindrical frame 10. A power transmission mechanism is provided between the motor 14 and the suction pipe 11. For example, a drive gear (not shown) is mounted on a motor shaft (not shown), and a driven gear(not shown) is mounted on one end of the suction pipe 11 and meshedly engaged with the drive gear.

Figure 4:
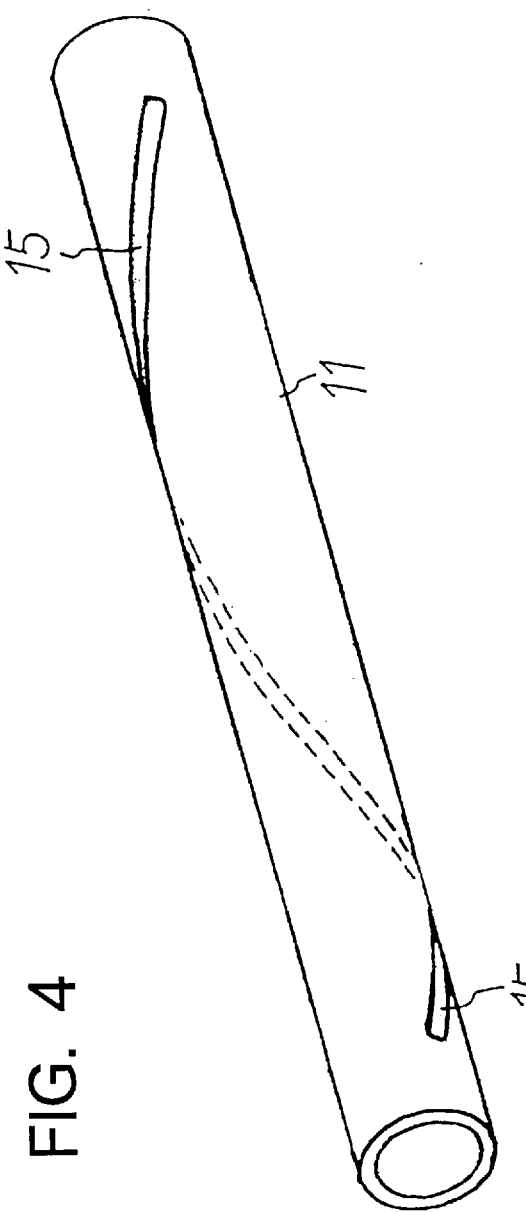
FIG. 4 is a perspective view showing a pipe housed in the collection device and formed with a spiral slit according to the first embodiment.

As best shown in FIG. 4, a slit-shaped suction opening 15 is formed in the pipe 11 so as to extend in the length-wise direction of the suction pipe 11 while spiraling the periphery of the pipe 11 by about 360 degrees, i.e., one spiral pitch with respect to the length of the suction pipe 11. At any one time, at least a portion of the opening 15 is exposed to the discharge opening 12 regardless of the rotation of the suction pipe 11 so as to provide a suction port 15A through which the powder in the hopper 9 can be introduced into the suction pipe 11. In other words, the suction port 15A is defined by an intersection between the discharge opening 12 and the spiral opening 15.

A cover 16 is detachably provided on another end of the cylindrical frame 10 while allowing the rotation of the suction pipe 11. A transport pipe 17 is detachably attached to the cover 16 and is in fluid communication with the pipe 11. The transport pipe 17 has an inner diameter equal to an inner diameter of the suction pipe 11 so as to smoothen the flow of the powders. The transport pipe 17 has another end connected to a cyclone 18 for separation and recycling of the powder 4. A suction device 19 is also connected to the cyclone 18.

The size of the spiral opening 15 is designed according to the cross-sectional area of the transport pipe 17 such that the suction port 15A exposing to the bottom discharge opening 12 has an area smaller than or equal to a cross-sectional area of the transport pipe 17. Incidentally, the size of the spiral opening 15 can be determined as desired according to properties of the power 4 and the performance of the suction device 19.

Figure 2:
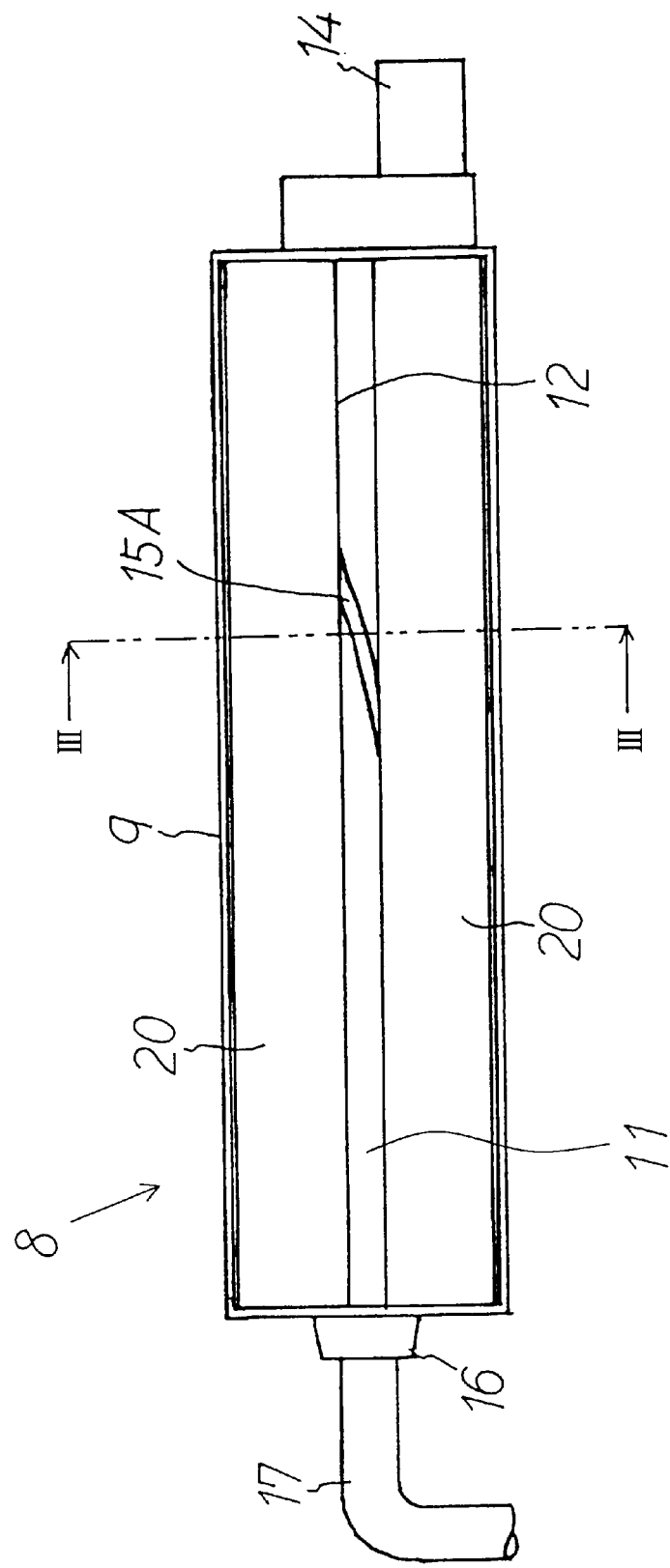
FIG. 2 is a plan view showing the powder collection device according to the embodiment.
Figure 3:
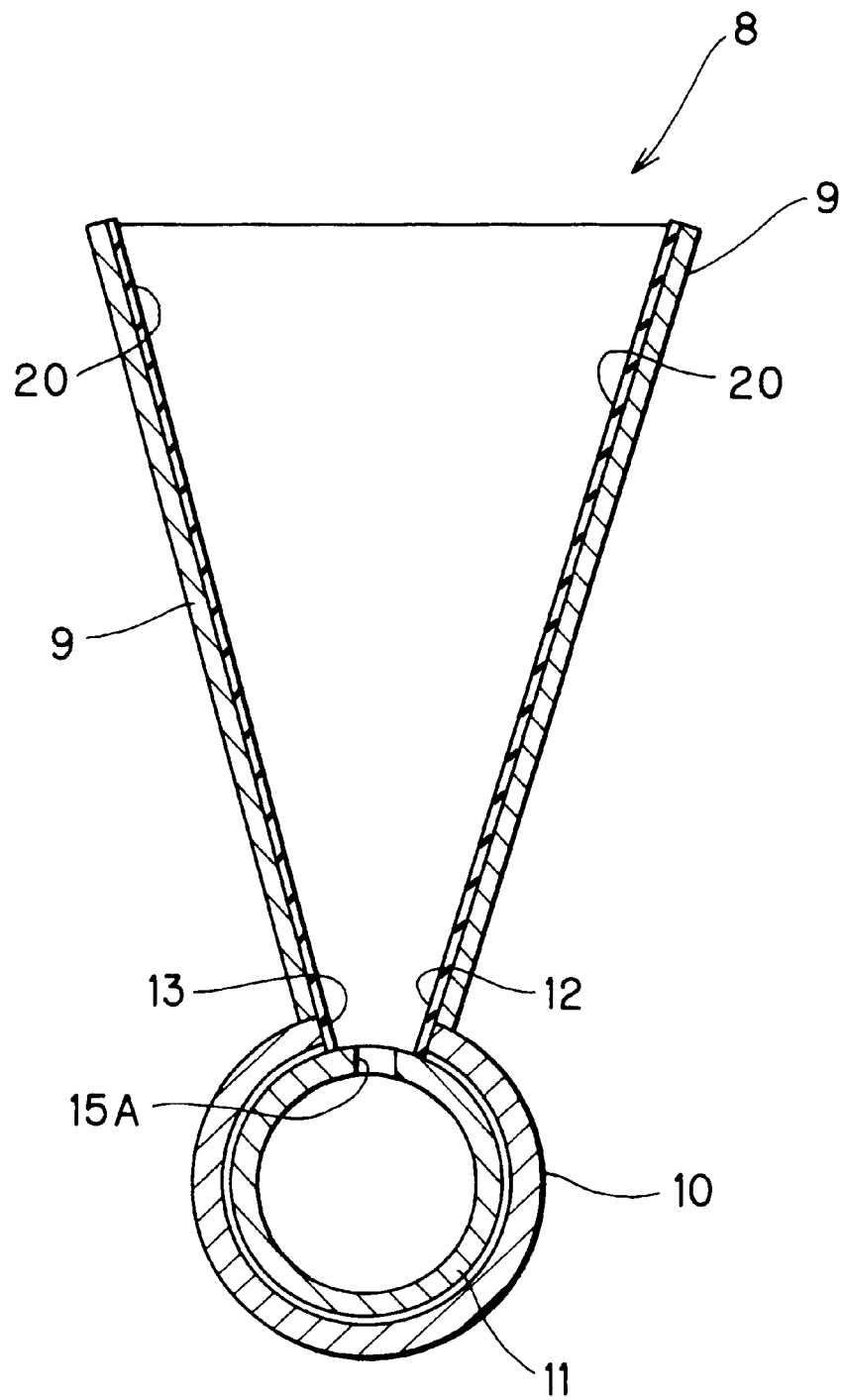
FIG. 3 is a cross-sectional view taken along the line III—III of FIG. 2.

As shown in FIGS. 2 and 3, a pair of seal boards 20 are attached to the major surfaces of the hopper 9 for hermetically sealing an edge of the bottom discharge opening 12 of the hopper 9 with the outer peripheral surface of the suction pipe 11. Each lower edge of the seal board 20 is in sliding contact with the outer peripheral surface of the pipe 11 when the latter is rotated about its axis. The seal boards 20 are detachable from the hopper 9.

In operation, the powder 4 on the conveyer belt 1 is scraped off by the scraper 7 so that it falls off at the end of the conveyer belt 1 into the hopper 9.

The powder 4 collected in the hopper 9 is sucked into the suction pipe 11 through the suction port 15A. The powder 4 is then transported through the transport pipe 17 to the cyclone 18 where it is separated and collected. Because the opening 15 is formed in the spiral shape, the suction port 15A moves constantly along a longitudinal direction of the discharge opening 12 in accordance with the rotation of the pipe 11. Therefore, the powder 14 can be evenly sucked along the length of the hopper 9. Further, because the suction port 15A is formed to a size equal to or smaller than the cross-sectional area of the transport pipe 17, the amount of the powder 4 sucked into the transport pipe 17 through the suction port 15A is proportional to the suction efficiency of the transport pipe 17. Therefore, no powder 4 remains in the transport pipe 17 and the like. In this way, the moving suction port 15A with this predetermined size can evenly and completely suck the powder 4 in the hopper 9 regardless of the length of the hopper 9.

As described above, according to the first embodiment of the present invention, the opening 15 of the suction pipe is a spiral slit, and the suction port 15A moves constantly in a lengthwise direction along the entire bottom discharge opening 12 in accordance with the rotation of the suction pipe 11. Therefore, powder in the hopper 9 can be sucked constantly in a fixed direction, and the powder even in a large-sized long hopper can be sucked and transported evenly and completely. Thus, highly effective suction can be performed. The powder is less likely to clog up, and can be easily cleaned up. Further, since the size of the suction port 15A moving in accordance with the pipe rotation is relatively small, the compact suction device 19 is available. Therefore, the suction device 19 can be inexpensively manufactured in a compact size. Moreover, the power of suction can be controlled easily by changing the size of the suction opening. In this way, the powder can be effectively transferred to the cyclone 18.

Figure 5:
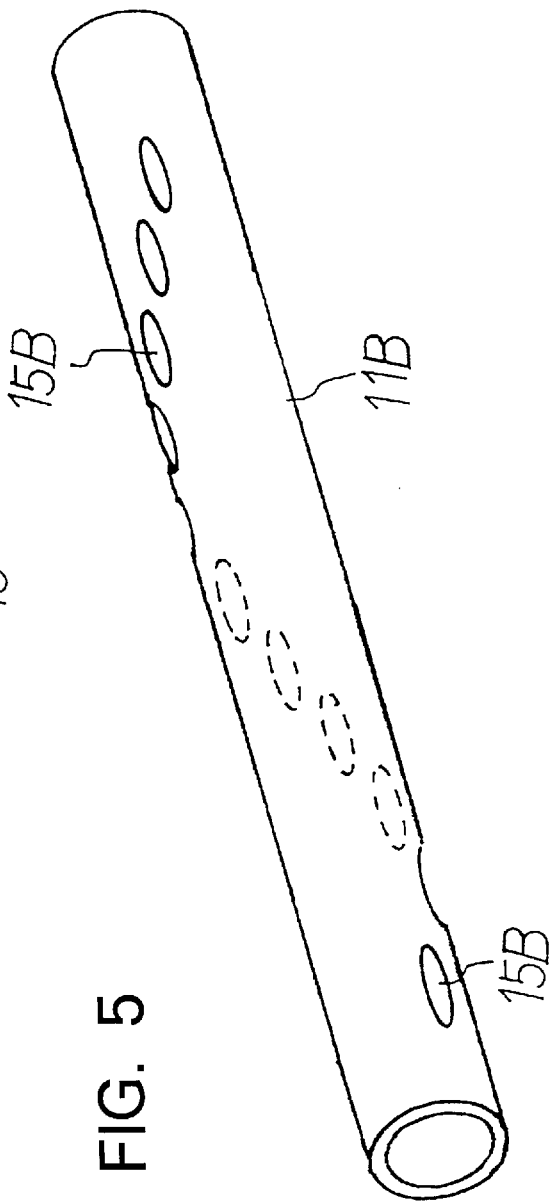
FIG. 5 is a perspective view showing a pipe according to a modified embodiment of the present invention.
Figure 6:
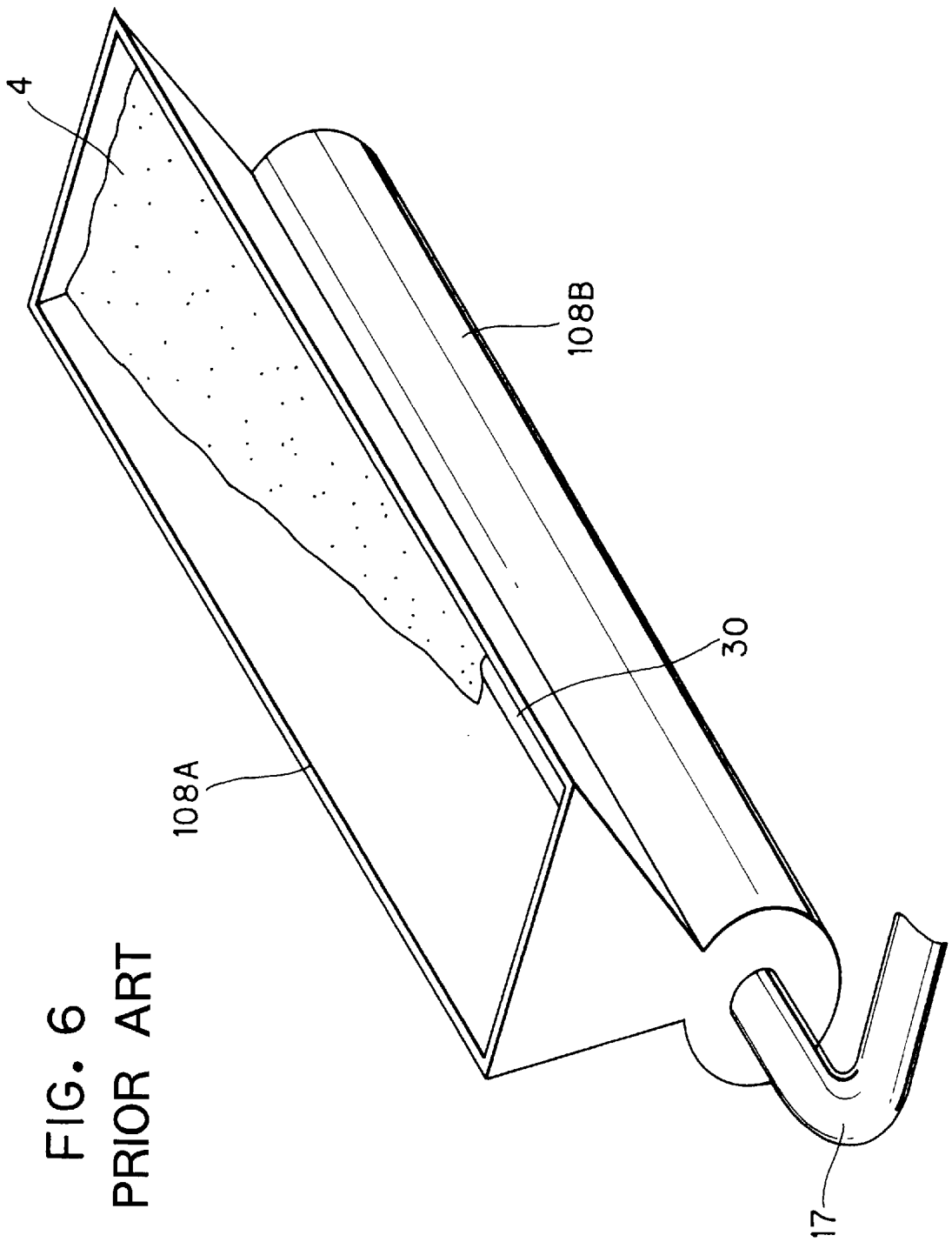
FIG. 6 is a perspective view showing a conventional powder collection device.

FIG. 5 shows a modification to the suction pipe. In the first embodiment, the slit opening 15 is of a continuous slit shape, and a part of the slit functions as the suction port 15A. On the other hand, in the modified embodiment, a plurality of suction ports 15B are arrayed spirally in a suction pipe 11B. Each suction port 15B is provided by a bore having area smaller than or equal to the cross-sectional inner area of the transport pipe 17. The pipe 11B is rotated continuously or discontinuously so that at least one bore 15B can be in fluid communication with the discharge opening 12. With this arrangement, the function and effect the same as those of the first embodiment can be provided.

While the invention has been described in detail and with reference to the specific embodiments thereof, it would be apparent to those skilled in the art that various changes and modifications may be made therein without departing from the spirit and scope of the invention. For example, in the illustrated embodiments, the suction opening is formed with the spiral continuous slit 15, or the suction opening is formed with a plurality of bores 15B. However, the suction opening can be formed in any shape as long as it is able to suck the powder in the hopper evenly in accordance with the rotation of the pipe. For example, the suction openings 15B can be arranged at random rather than in a spiral array and still be capable of evenly sucking the bottom opening 12 of the hopper 9.

Further, it is possible to form a plurality of slits in the suction pipe. By arranging the plurality of slits at intended portions, rather than in a spiral line, the suction portion can be limited to a specific area, or intended sucking order can be provided.

Further, according to the configuration shown in FIGS. 4 and 5, the spiral line is making one round along the longitudinal axis of the suction pipe 11 or 11B. This arrangement is advantageous in continuous suction operation in accordance with the rotation of the suction pipe. However as a modification to the embodiment shown in FIG. 5, several ports 15B can be positioned offset from the spiral line. In the latter case, in a specific rotation angle of the suction pipe 11B, neither one of the suction port 15B is in fluid communication with the discharge opening 12. That is, the suction is performed intermittently. With such an arrangement, if a plurality of powder collection devices are connected for collecting powders at various locations, and these powder collection devices are connected to a single cyclone 18, and if only one powder collection device provides a fluid communication with its hopper while the remaining powder collection devices do not provide communication with their hoppers, only the single cyclone is available for all powder collection devices.

Further, the pipe 11 or 11B can be rotatable in opposite directions about its axis. Also, instead of the rotational motion of the suction pipe 11 or 11B about their axes, linear movement of a pipe along its axis is conceivable so as to move the suction port along the discharge opening 12.

What is claimed is:

1. A powder collecting and transporting device comprising:

an elongated hopper for receiving powders, the elongated hopper having a bottom portion formed with an elongated powder discharge opening;

an elongated frame disposed below and in communication with the powder discharge opening;

a suction pipe movably supported in the frame and having a sleeve portion formed with an opening, a part of the opening formed in the sleeve portion being in alignment with the powder discharge opening for providing a suction sort in fluid communication between the hopper and the suction pipe, wherein the part of the opening in alignment with the powder discharge opening continuously changes to a different alternate position along the powder discharge opening upon movement of the suction pipe;

a transport pipe fluidly connected to the suction pipe; and a suction device fluidly connected to the transport pipe for introducing the powders in the hopper into the suction pipe through the suction port.

2. The powder collecting and transporting device as claimed in claim 1, wherein said frame has a cylindrical shape, and wherein said powder collecting and transporting device further comprises a drive means for rotating the suction pipe about an axis thereof, the opening formed in the sleeve portion of the suction pipe having a consecutive spiral shape around a periphery of the suction pipe.

3. The powder collecting and transporting device as claimed in claim 2, wherein the suction port is formed by an intersection of the opening formed in the sleeve portion with the discharge opening, the suction port having an area equal to an inner cross-sectional area of the transport pipe, the suction port being movable in a longitudinal direction of the discharge opening upon rotation of the suction pipe.

4. The powder collecting and transporting device as claimed in claim 3, further comprising a sealing board disposed at an inner surface of the hopper, the sealing board having a lower edge in sliding contact with an outer peripheral surface of the suction pipe.

5. The powder collecting and transporting device as claimed in claim 1, further comprising drive means for rotating the suction pipe about an axis thereof, and wherein the opening formed in the sleeve portion of the suction pipe comprises a plurality of bores arrayed in a spiral line around a periphery of the suction pipe, each bore serving as the suction port when aligned with the powder discharge opening, the suction port being movable in a longitudinal direction of the discharge opening upon rotation of the suction pipe.

6. The powder collecting and transporting device as claimed in claim 1, further comprising a sealing board disposed at an inner surface of the hopper, the sealing board having a lower edge in sliding contact with an outer peripheral surface of the suction pipe.

7. The powder collecting and transporting device as claimed in claim 1, wherein the suction port is formed by an intersection of the opening formed in the sleeve portion with the discharge opening, the suction port having an area which is not greater than an inner cross-sectional area of the transport pipe, the suction port being movable in a longitudinal direction of the discharge opening upon the movement of the suction pipe.

8. A powder collecting and transporting device comprising:

an elongated hopper for receiving powders, the elongated hopper having a bottom portion formed with an elongated powder discharge opening;

an elongated cylindrical frame disposed below and in communication with the powder discharge opening;

a suction pipe movably supported in the cylindrical frame and having an axis and a sleeve portion formed with an opening, a part of the opening formed in the sleeve portion being in alignment with the powder discharge opening upon movement of the suction pipe for providing a suction port in fluid communication between the hopper and the pipe;

a transport pipe fluidly connected to the suction pipe;

a suction device fluidly connected to the transport pipe for introducing the powders in the hopper into the suction pipe through the suction port; and drive means for rotating the suction pipe about the axis thereof; and wherein the opening formed in the sleeve portion of the suction pipe comprises a plurality of bores arrayed in a spiral line around a periphery of the suction pipe, each bore serving as the suction port when aligned with the powder discharge opening, the suction port being movable in a longitudinal direction of the discharge opening upon rotation of the suction pipe.

* * * * *